US012777009B2

(12) United States Patent
Everett

(10) Patent No.: US 12,777,009 B2
(45) **Date of Patent: *Oct. 27, 2026**

(54) SYSTEMS AND METHODS FOR REQUESTING, ACCESSING, AND DELIVERING DATA WITHOUT EXPOSING PERSONALLY IDENTIFIABLE INFORMATION AND WITHOUT A CREDENTIALED LOGIN PROCESS

(71) Applicant: Don Everett, Irving, TX (US)

(72) Inventor: Don Everett, Irving, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 19/032,202

(22) Filed: Jan. 20, 2025

(65) Prior Publication Data

US 2026/0135829 A1 May 14, 2026

Related U.S. Application Data

(63) Continuation of application No. 18/220,388, filed on Jul. 11, 2023, now Pat. No. 12,206,636.

(60) Provisional application No. 63/388,075, filed on Jul. 11, 2022.

(51) Int. Cl.
*H04L 51/21* (2022.01)

(52) U.S. Cl.
CPC .................................... *H04L 51/21* (2022.05)

(58) Field of Classification Search
None
See application file for complete search history.

(56) References Cited

U.S. PATENT DOCUMENTS

2022/0207531 A1* 6/2022 Kruse .................. H04L 9/3247

* cited by examiner

*Primary Examiner* — Bryan Y Lee
(74) *Attorney, Agent, or Firm* — Harper & Bates LLP; Shannon W. Bates

(57) ABSTRACT

Systems and methods for requesting, accessing and delivering data in a way that does not require users, or others acting on behalf of users, to log in to a dedicated computer application and does not rely on humans to manually retrieve the data. A Requester ("REQ") sends an email or cellular text message to a server to request data. The server identifies the REQ based on the REQ's email address or mobile phone number and then deciphers what data to compile after interpreting the REQ's message. The server then returns a link to the REQ's email address or mobile phone number. The REQ can select the link to view the data. The email or text message is sent by the REQ, the link is returned by the server to the REQ's email address or mobile phone number, and the data is displayed, all without revealing any personally identifiable information ("PII").

22 Claims, 4 Drawing Sheets

SYSTEMS AND METHODS FOR REQUESTING, ACCESSING, AND DELIVERING DATA WITHOUT EXPOSING PERSONALLY IDENTIFIABLE INFORMATION AND WITHOUT A CREDENTIALED LOGIN PROCESS

CROSS-REFERENCE TO RELATED APPLICATIONS

This application is a continuation of U.S. Non-Provisional patent application Ser. No. 18/220,388 filed Jul. 11, 2023, and entitled "Systems and Methods for Requesting, Accessing, and Delivering Data Without Exposing Personally Identifiable Information and Without a Credentialed Login Process", which claims priority to U.S. Provisional Patent Application Ser. No. 63/388,075 filed Jul. 11, 2022, and entitled "Systems and Methods for Requesting, Accessing, and Delivering Data Without Exposing Personally Identifiable Information and Without a Credentialed Login Process", both of which are incorporated herein by reference in their entirety.

TECHNICAL FIELD

The present disclosure relates to systems and methods for requesting, accessing and delivering data without burdening the user, or another person acting on behalf of the user, with the need to log in to an online application or a mobile application. The present disclosure also relates to systems and methods for requesting, accessing and delivering data without exposing personally identifiable information.

BACKGROUND

Traditional methods for obtaining data with personally identifiable information (PII) may involve a user directly or indirectly (i.e. through a third party) accessing content via an online application or website operatively coupled to a database that contains the desired data.

Directly accessing content may involve a credentialed login process to the online application or website, and queries for the desired data as well as retrieval of the desired data may risk exposing the PII. Security risks include the potential for login credentials to be discovered and/or the system being susceptible to hackers.

Indirectly accessing content necessarily involves a time delay while the user awaits the desired data from the third party. In addition, this approach presents more security risks because the chain of custody for the retrieved desired data is expanded.

SUMMARY

The present disclosure relates to methods, computer programming products, and apparatus for requesting, accessing and delivering data.

In various implementations, the methods, computer programming products, and apparatus enable requesting, accessing and delivering data without exposing PII and/or without a credentialed login process.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1:
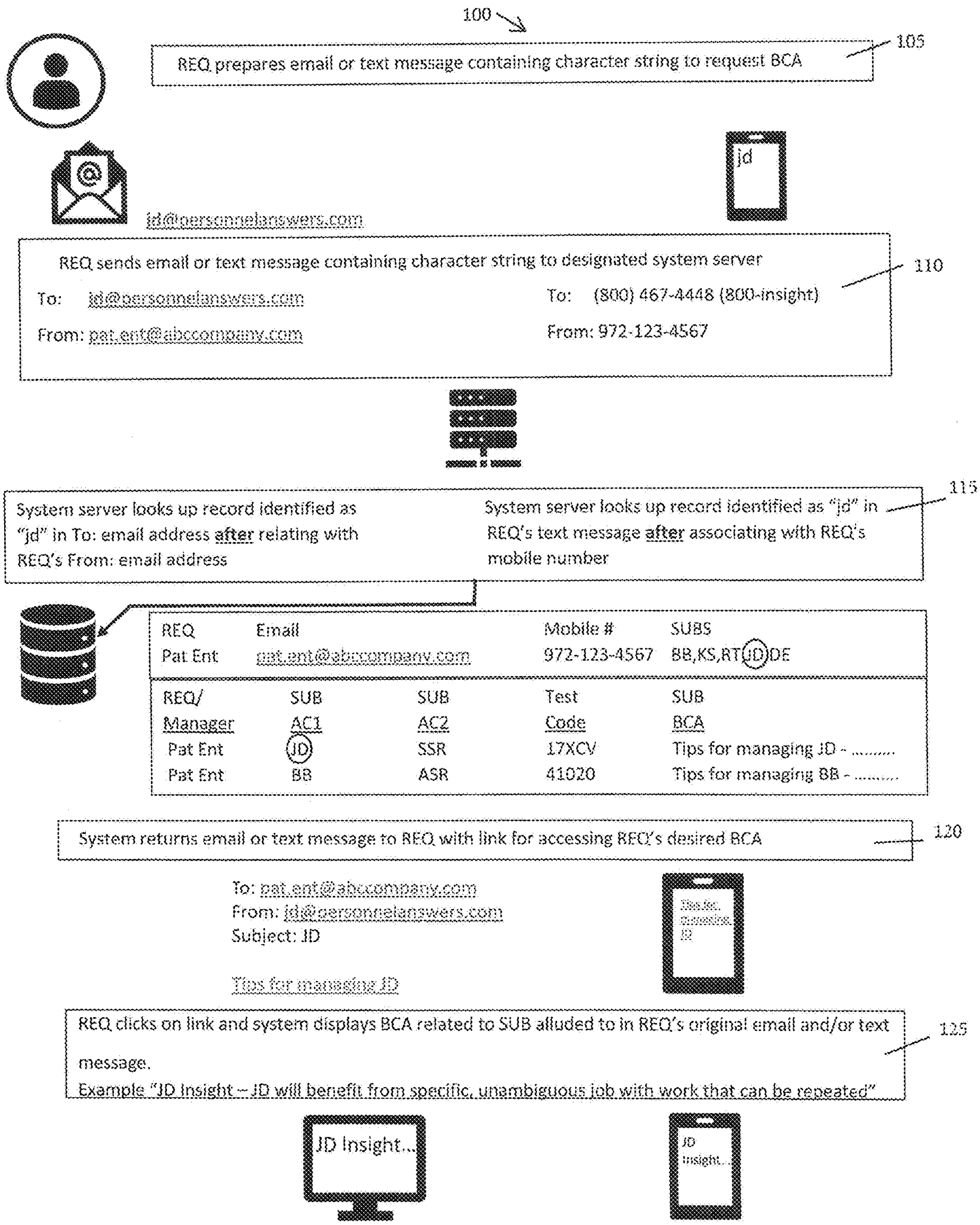
FIG. 1 illustrates a schematic flow chart of email and text message implementations for requesting, accessing and delivering data, according to the present disclosure.

Implementations of the present disclosure comprise methods, computer programming products, and apparatus for requesting, accessing and delivering data. Implementations of the present disclosure comprise systems and methods for requesting, accessing and delivering data without requiring the user, or another person acting on behalf of the user, to log in to a dedicated computer application or to rely on a person to manually retrieve the data. Implementations of the present disclosure comprise systems and methods for requesting, accessing and delivering data in an on-demand, automated format using email and/or cellular text messaging. Implementations of the present disclosure comprise systems and methods for requesting, accessing, and delivering data without exposing personally identifiable information ("PII").

In some implementations of the present disclosure, a Requester ("REQ") sends an email or cellular text message to a system server to request data. The system server identifies the REQ based on the REQ's email address or mobile phone number and then deciphers what data to compile after interpreting the REQ's message. The system server then returns a link to the REQ's email address or mobile phone number. The REQ can select the link to view the data on any hardware device configured with the REQ's respective email address and/or mobile phone number.

In some implementations, the data may relate to or include PII. In such implementations, the email or cellular text message is sent by the REQ, the link is returned by the system server to the REQ's email address or mobile phone number, and the REQ's data is displayed, all without revealing any PII.

In some implementations of the present disclosure, the data comprises behavioral characteristics and advice ("BCA") regarding a participating subject ("SUB"). Currently, BCA is made available by way of interviews, surveys, and/or behavioral tests; however, behavioral tests have become the most common approach. BCA is either stored electronically or generated dynamically at the time of the REQ's query. In both cases, delivery of BCA to a REQ involves real-time or near real-time online presentment to the REQ, or dispatchment (via email or text messaging, possibly with attachments or links) to the REQ as well as to any other people with whom the REQ wishes to share BCA.

Furthermore, both cases, by means of data storage, reference in the REQ's query, and/or delivery content, necessitate the use of PII (i.e., SUB name, SUB business email address, SUB personal email address, SUB phone number, etc.). The rate at which PII is compromised, due to electronic data security breaches or user lapses, errors, etc., despite many protection protocols, highlights the need for a method to request and deliver BCA in a way that does not depend on the traditional storage, query, and/or delivery methods that expose PII.

As a case in point, consider a sequence whereby a REQ logs into an online application with the intent of retrieving BCA. First, the REQ's login credentials are vulnerable to discovery by others, which could enable others to access PII using someone else's REQ information. Second, the REQ may reference PII online when forming/entering their online request for BCA, which could be viewed by others. Third, PII could be displayed to the REQ online in response to their request, which could also be viewed by others. Fourth, PII exists in the underlying database repository that is accessed to satisfy the REQ's request, which is at risk of cyber-attacks if the data is not encrypted. To date, BCA applications have resisted strenuous safeguarding methods like encrypted table values because it hinders the user friendliness of their system. Fifth, the REQ's request for BCA could be answered with email and/or text message with accompanying PII, or links that retrieve PII along with BCA. These REQ requests for BCA that result in dispatchment of BCA in emails or text messages are in danger of being inappropriately shared, copied, forwarded, etc. with and/or to others, as well as posing a threat due to malware, viruses, etc. The risk associated with all of these examples increases proportionately as the number of users expands.

In some implementations of the present disclosure, when the REQ sends an email or cellular text message to the system to request BCA regarding a SUB, the system server identifies the REQ based on the REQ's email address or mobile phone number and then deciphers what data to compile after interpreting the REQ's message, which does not contain any PII. The system server resolves the REQ's request by interpreting alias characters ("AC") without any PII, and factoring the relationship between the REQ and a SUB or SUBs. The system server then returns a link to the REQ, void of any PII, to the REQ's email address or mobile phone number. The link can be viewed by the REQ on any hardware device configured with the REQ's respective email address and/or mobile phone number. The REQ can then select the link and the system will display the BCA without revealing any PII.

With respect to an email implementation, the system may be established by provisioning an email Domain Name (appears after the @ symbol) and a set of User Names (the first part of an email address before the @ symbol) associated with that Domain Name. User Names are likely to be short character strings like two characters representing first/last name initials or a series of numbers (i.e., 1-99). A straightforward application using the systems and methods of the present disclosure could be parents interested in a hosted service that can improve their parental skills, and the service includes administering a behavioral test to each of their children to establish BCA. The parents would then be REQs desiring BCA related to their children as SUBS. This arrangement of information would enable the parent to query, access, and receive BCA specifically related to one of their children without exposing any of their children's PII. User Names could be represented as numbers indicating the descending order of their children by age.

FIG. 1 depicts an implementation of a system and method comprising an enterprise application of the present disclosure. The implementation of FIG. 1 delivers to management member REQs of any organization BCA related to their SUBs, in this case, their subordinates who report to them. In this example, a Domain Name of personnelanswers.com is considered established along with a set of 676 User Names associated with that Domain Name. In this case, the set of User Names provides for each possible combination (26×26=676) of first name/last name initials (i.e., "JD" for John Doe, "DJ" for Dave Jones, etc.) using alphabetic characters.

The system maintains a record containing the email address of each management member, who is in effect a REQ who may seek BCA, together with AC related to SUBs comprised of: (1) first name/last name initials, and (2) additional AC in the event there are SUBs with the same first name/last name initials. Managers requesting BCA can have their BCA retrieved in real-time from an electronic permanent data store or in near real-time after the BCA is compiled dynamically at run-time of the request. The manager of record simply emails the personnelanswers.com Domain Name using the initials of their SUB of interest as the User Name.

The system identifies the manager of record from their REQ email address and determines the SUB of record by matching the initials in the User Name (i.e., jd@personnelanswers.com) with the initials of SUBs associated with the manager requesting BCA. It accesses and/or compiles the BCA accordingly and returns a link via email to the REQ manager.

The REQ manager then clicks on the link and the BCA pertaining to one of their SUBs is displayed by opening a new window in their browser and only presenting initials along with the suitable content. In this use case, a manager would elect to utilize additional AC if any of their SUBS shared the same initials. If that were the case, the system would return to the manager via email multiple links containing the additional AC (i.e., "SSR" for Senior Support Rep, "ASR" for Associate Support Rep) belonging to the SUBS with the same initials. The REQ manager would then click on the appropriate AC link to view the corresponding BCA.

If the implementer of the systems and methods of the present disclosure organizes BCA by category, type, topic, etc., email implementations of the present disclosure can also utilize the Subject field and message area using the same process in order to embellish their requests for BCA without revealing PII. For example, a manager emailing jd@personnelanswers.com could also type a "p" in the subject line for BCA especially relevant for performance reviews. It should also be noted that an email implementation of the present disclosure could alternatively rely on a single email address (i.e., insight@info4managers.com). In the example described above, the configuration of multiple email addresses tied to first name/last name initials could be avoided, in order to reduce costs, by inserting initials in the Subject field and/or body of the email message. However, there is a slight chance this variation may lead to more user error; therefore, the application using multiple email addresses is considered preferable.

In the case that BCA is available that takes into account the REQ's BCA and incorporates it into the BCA related to the SUB of interest, the system can include that in the content delivered to REQs. As an example, some behavioral tests are administered to managers, in addition to their direct reports, in order to enhance or improve the BCA provided to the managers about their direct reports.

The systems and methods of the present disclosure can operate much the same way via text messaging. However, it is anticipated that a single mobile phone number application is much more likely given the possibility that the desired mobile phone numbers for any multiple number application may not be available to provision. For instance, an implementation of the present disclosure may include provisioning a set of cellular phone numbers; ideally with 8 of the 10 numbers a constant and 2 of the 10 numbers to be used as variables (i.e., 800-knowujd for retrieving information related to John Doe). In this example, the last two numbers are variable (i.e., 800-knowujd), and serve the same purpose as the User Name in the email address containing initials in the email implementation described above. This implementation may not be as feasible because, unlike its email application alternative, the concept of purchasing a domain doesn't exist and the desired mobile numbers may simply not be available. In addition, text messages must contain a message entry. It is therefore anticipated that a single mobile number application will be a more common implementation of the present disclosure.

Considering the REQ manager BCA application introduced above, the system would maintain a record containing each management REQ's mobile phone number, and, like its email address counterpart application, would also store AC made up of (1) first name/last name initials, and (2) additional AC in the event there are SUBs with the same first name/last name initials. The retrieval of BCA would also be done in the same fashion as email models; be it real-time from a permanent data store or near real-time content compilations put together at run-time. The manager of record simply sends a text message to a provisioned mobile number (i.e., 800-insight (800-467-4448)) containing the initials of their subordinate of interest in the text message.

The system identifies the manager of record from their REQ mobile number and determines the subordinate of record by matching the initials in the REQ manager's text message with the initials of SUBs associated with the manager sending the message. The remaining steps are consistent with the email method detailed above. However, managers wanting more specific content could embellish their text messages (i.e., adding a "p" after they enter initials for content especially relevant for performance reviews) without the duality of input options (Subject field and message area) accompanying email messages.

In both email and text message implementations, any user submitting invalid characters will receive suitable error message from system server.

Referring again to FIG. 1, as it relates to the aforementioned REQ manager BCA implementation, one implementation of a method 100 of the present disclosure for email or text message requests for BCA without requiring PII in the request, or revealing PII in the content returned, begins at step 105 when a REQ manager prepares an email or text message containing AC. Step 110 shows an example that includes sender and receiver entries for both an email and text message from a REQ manager. The email sample shows the AC being included in the email address itself as the User Name, whereas it is the whole message in the text message sample. Step 110 also shows the email message being sent to a specific email Domain Name, and the text message being sent to a specific cellular phone number; both of which have been provisioned with the system.

At step 115, the system server verifies that the AC contained in messages matches at least one AC record associated with the REQ's set of SUBS, and, if valid, retrieves the BCA sought by REQ manager. In step 115, the system could retrieve BCA that is electronically stored, or, for environments that do not save BCA in the underlying database, could derive BCA dynamically at run-time by means of a metadata element like a unique test code. The system could retrieve a SUB's test code and access the SUB's previously completed test responses, and then execute a behavioral test's algorithms to produce BCA at run-time.

At step 120, the system returns a message, to any device configured with REQ's email address and/or mobile phone number, containing a link pertaining to the SUB of interest. In step 125, the REQ clicks on the link sent in step 120 and is presented with the BCA they requested. Step 125 could optionally require that the link associated with the requested BCA is restricted by access count and/or time duration.

The initial formation of metadata required by the system can be performed manually with online interface and/or programmatically by way of a batch input file interface. Metadata may include, but is not limited to, behavioral test codes, REQ email addresses, REQ mobile phone numbers, SUBs, AC, BCA, etc. Sensitive data like email addresses and mobile phone numbers will be safeguarded with encryption methods and techniques, like encrypted table values. Thus, PII is encrypted or eliminated altogether for all data requests, retrievals, deliveries, and storage.

Implementations of the present disclosure provide a mechanism for requesting, accessing and delivering data without exposing PII and without a credentialed login process. The term "mechanism" refers to elements of the present disclosure that perform various operations, functions, and the like. A "mechanism," as the term is used herein, may be in the form of an apparatus, a system, a method, or a computer program product. In the case of a method, the method is implemented by one or more devices, apparatus, computers, data processing systems, or the like. In the case of a computer program product, the logic represented by computer code or instructions embodied in or on the computer program product is executed by one or more hardware devices to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

Figure 2:
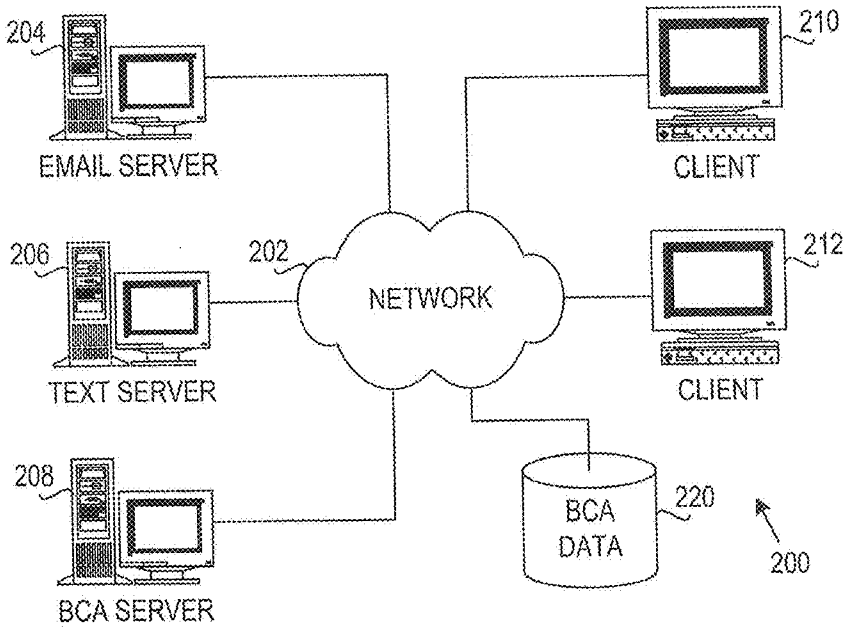
FIG. 2 illustrates a representative diagram of a distributed data processing system in which aspects of the methods for requesting, accessing and delivering data according to the present disclosure may be implemented.
Figure 3:
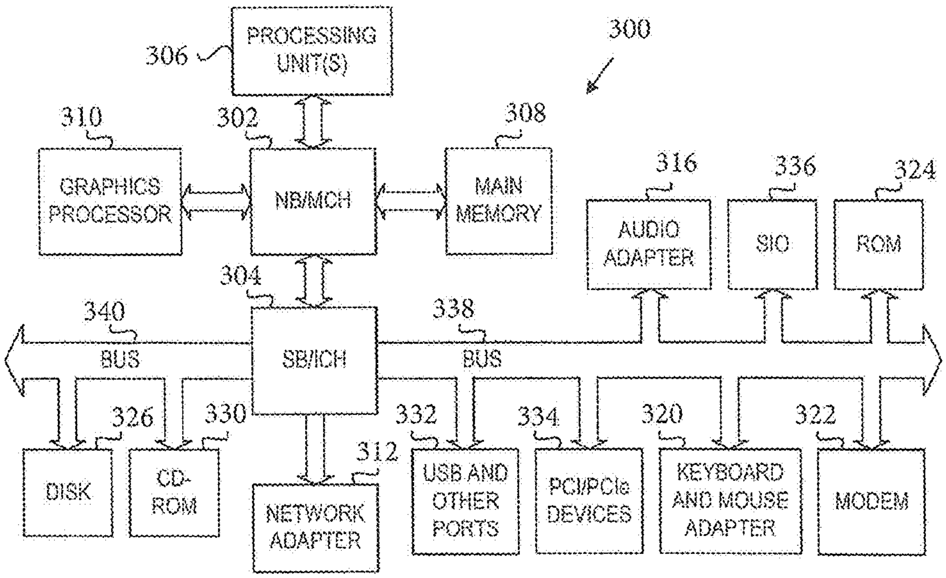
FIG. 3 illustrates a representative block diagram of a computing device in which aspects of the methods for requesting, accessing and delivering data according to the present disclosure may be implemented.

The implementations of the present disclosure may be employed in many different types of data processing environments. FIG. 2 and FIG. 3 illustrate representative example environments in which aspects of the present disclosure may be implemented. FIG. 2 and FIG. 3 are only examples and are not intended to limit the environments in which implementations of the present disclosure may be used. Many modifications to the depicted environments may be made without departing from the spirit and scope of the present disclosure.

FIG. 2 depicts a pictorial representation of an example distributed data processing system in which aspects of the various implementations may be employed. Distributed data processing system 200 may include a network of computers. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted implementation, server 204, server 206, and server 208 are connected to network 202 along with data storage unit 220. In an implementation, server 204 is an email server, server 206 is a text server, server 208 is a BCA server, and data storage unit 220 is a BCA data storage unit. In addition, clients 210 and 212 are also connected to network 202. These clients 210 and 212 may be, for example, personal computers, network computers, laptop computers, computer tablets, mobile telephones, or the like. Distributed data processing system 200 may include additional servers, clients, and other devices not shown.

In the depicted representative implementation, distributed data processing system 200 is the Internet with network 202 representing a worldwide collection of networks and gateways that use the Transmission Control Protocol/Internet Protocol (TCP/IP) suite of protocols to communicate with one another. Of course, other implementations of the distributed data processing system may also include different types of networks, such as for example, an intranet, a local area network (LAN), a wide area network (WAN), or the like. As shown in FIG. 2, one or more of the computing devices, e.g., server 204, server 206, and/or server 208, may be specifically configured to implement a mechanism for requesting, accessing and delivering data. The configuring of the computing device may comprise the providing of application specific hardware, firmware, or the like to facilitate the performance of the operations and generation of the outputs described herein with regard to the illustrative implementations. The configuring of the computing device may also, or alternatively, comprise the providing of software applications stored in one or more storage devices and loaded into memory of a computing device, such as server 204, server 206, and/or server 208, for causing one or more hardware processors of the computing device to execute the software applications that configure the processors to perform the operations and generate the outputs described herein with regard to the illustrative implementations. Moreover, any combination of application specific hardware, firmware, software applications executed on hardware, or the like, may be used without departing from the spirit and scope of the present disclosure. It should be appreciated that once the computing device is configured in one of these ways, the computing device becomes a specialized computing device specifically configured to implement the mechanisms of the various implementations of the present disclosure and is not a general-purpose computing device. Moreover, as described hereafter, the implementation of the mechanisms of the present disclosure improves the functionality of the computing device and provides a useful and concrete result that facilitates requesting, accessing and delivering data.

As noted above, the mechanisms of the various implementations of the present disclosure utilize specifically configured computing devices, or data processing systems, to perform the operations for requesting, accessing and delivering data. These computing devices, or data processing systems, may comprise various hardware elements specifically configured, either through hardware configuration, software configuration, or a combination of hardware and software configuration, to implement one or more of the systems/subsystems described herein. FIG. 3 is a block diagram of a representative data processing system in which aspects of the various implementations of the present disclosure may be employed. Data processing system 300 is an example of a computer, such as server 204, server 206, and/or server 208 in FIG. 2, in which computer usable code or instructions implementing the processes and aspects of the various implementations of the present disclosure may be located and/or executed to achieve the operation, output, and external effects of the implementations as described herein.

In the representative example depicted in FIG. 3, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS). HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. An object-oriented programming system may run in conjunction with the operating system and provides calls to the operating system from object-oriented programs or applications executing on data processing system 300.

Instructions for the operating system, the object-oriented programming system, and applications or programs are located on storage devices, such as HDD 326, and may be loaded into main memory 308 for execution by processing unit 306. The processes of the present disclosure may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, the mechanisms of the present disclosure may be implemented as application specific hardware, firmware, or the like, application software stored in a storage device, such as HDD 326 and loaded into memory, such as main memory 308, or executed by one or more hardware processors, such as processing unit 306, or the like. As such, the computing device shown in FIG. 3 becomes specifically configured to implement the mechanisms of the present disclosure and specifically configured to perform the operations and generate the outputs described hereafter with regard to the mechanism for requesting, accessing and delivering data.

The hardware in FIG. 2 and FIG. 3 may vary depending on the implementation. Other internal hardware or peripheral devices, such as flash memory, equivalent non-volatile memory, or optical disk drives and the like, may be used in addition to or in place of the hardware depicted in FIG. 2 and FIG. 3. The data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
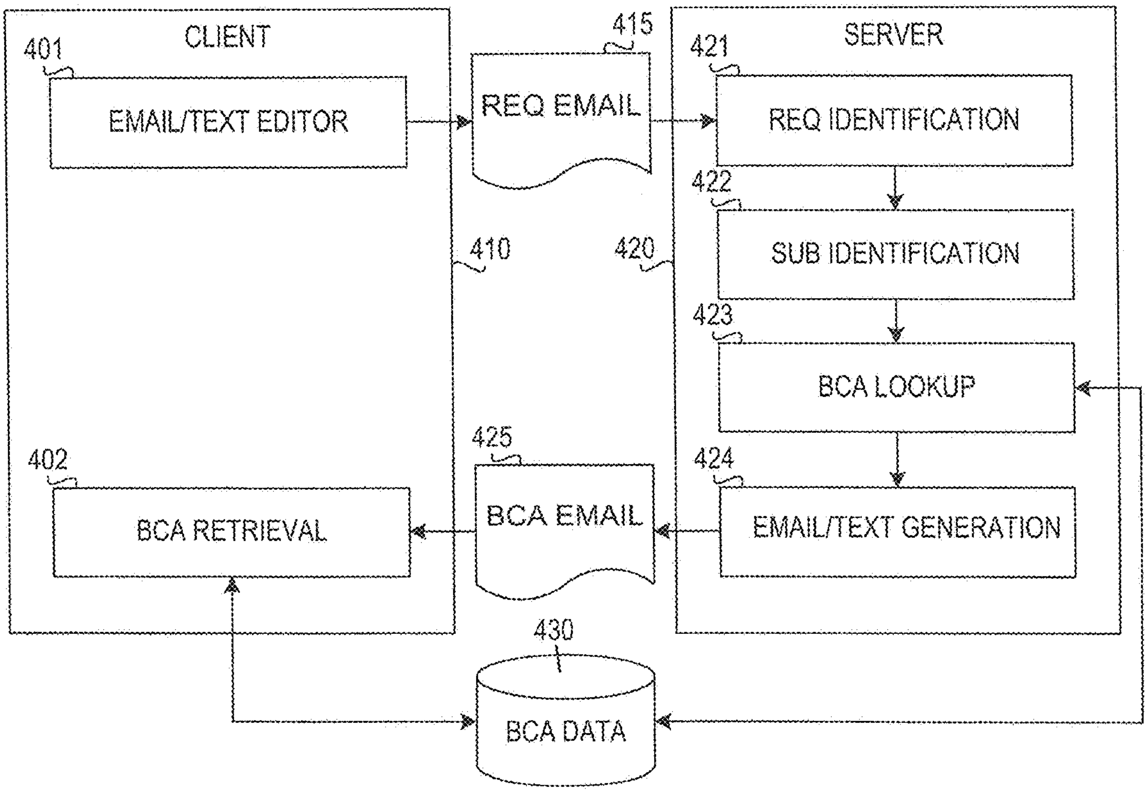
FIG. 4 illustrates a block diagram of a representative mechanism for requesting, accessing and delivering data according to an implementation of the present disclosure.

FIG. 4 is a block diagram illustrating a mechanism for requesting, accessing and delivering data in accordance with an implementation of the present disclosure. Client platform 410 includes an email/text editor component 401 and a data retrieval component 402. In the implementation shown in FIG. 4, the data retrieval component 402 is a BCA retrieval component.

The email/text editor 401 of the client platform 410 enables a user, such as a REQ, to prepare an email or a text message to be sent to a server platform 420 of a data retrieval system. In the implementation shown in FIG. 4, a REQ email 415 is prepared within the email/text editor 401 of the client platform 410 and transmitted to the server platform 420 to request data.

The server platform 420 of the data retrieval system includes a REQ identification component 421, a SUB identification component 422, a data lookup component 423 that is operatively coupled to a data storage repository 430, and an email/text generation component 424. In the implementation shown in FIG. 4, the data lookup component 423 is a BCA lookup component and the data storage repository 430 houses BCA data.

REQ identification component 421 identifies the REQ based on the email address from which the REQ email 415 was sent. In implementations where the REQ prepares a text message in the email/text editor 401, the REQ identification component 421 identifies the REQ based on the telephone number from which the REQ text was sent.

SUB identification component 422 identifies the SUB based on both the REQ identified by the REQ identification component 421 and the content of the REQ email 415 or the REQ text. In some implementations, the SUB identification component 422 interprets AC within the REQ email 415 or the REQ text to identify the SUB.

BCA lookup component 423 identifies the requested BCA data about the SUB stored in the BCA data repository 430 and creates a link to the requested data. In the implementation shown in FIG. 4, email/text generation component 424 generates a BCA email 425 that contains the link. The BCA email 425 is transmitted from the server platform 420 of the data retrieval system to the client platform 410 where the REQ receives the email. In implementations where the REQ initially uses the email/text editor 401 to send a text message to the server 420, the email/text generation component 424 generates a BCA text message that contains the link, and the BCA text message is transmitted to the client platform 410 where the REQ receives the text message. The REQ utilizes the BCA retrieval component 402, which in the present implementation is a link to the requested data, to access the BCA data of the SUB stored in the BCA storage repository 430.

The present disclosure may be an apparatus, a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As noted above, the present disclosure may take the form of an entirely hardware implementation, an entirely software implementation or an implementation containing both hardware and software elements. In one example, the mechanisms of present disclosure are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code to reduce the number of times code must be retrieved from bulk storage during execution. The memory may be of various types, such as ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the present disclosure.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present disclosure.

The primary benefits associated with the systems and methods of the present disclosure are ease of use and efficiency due to its minimalist, on-demand nature, and, more importantly, the elimination of risk associated with exposing PII in query requests and corresponding information retrieved in order to satisfy related query requests. It provides universal techniques that are dramatically less burdensome and more secure than alternative means. Alternative means would include: (1) directly accessing content via online applications or websites with employee behavioral test data (i.e., hosting service provided by a behavioral science test vendor), and (2) indirectly accessing content by asking a third party to retrieve content for you from online applications or websites with employee behavioral test data (i.e., asking a user from the Human Resources department to retrieve content regarding an employee).

Regarding the first alternative, there will be various and inconsistent user levels of interest and capabilities among employees related to learning applications, new releases, etc., and how systems may work differently, if at all, on some of the users' devices. A critical security risk always exists with this approach due to the vulnerability of PII being unprotected as a result of login credentials being discovered, and/or the susceptibility of the systems and corresponding PII being unveiled by hackers. The second alternative is not on-demand; the amount of time that may pass before the user receives their requested content is unknown. In addition to the uncertainty as it relates to responsiveness, this alternative presents more security risks because the chain of custody regarding the content retrieved is expanded. For example, it is very common for a User of an online application to save the content requested as a PDF report and email it to the person who originally requested it. This introduction of email programs increases the possibility of security threats because PII is now exposed to more systems and the email messages themselves can be mistakenly forwarded, copied, exposed to malware and viruses, etc.

Along with the intra-company example involving manager insight about subordinates, to illustrate the present disclosure's improvement regarding security among inter-company models, consider a manager who would like to know as much as possible about his external clients for customer service purposes. He can administer a survey to each of his clients regarding customer service priorities (i.e., call-back times, empathy of representatives, resolution outcomes, support fees, etc.) and store that information in a CRM (Customer Relationship Management) system. However, PII will need to be maintained in the CRM database, which introduces all the risks previously mentioned when customer information is queried and retrieved. The implementations of the present disclosure would enable the manager in this case to access client customer service preferences, priorities, etc. without including any PII in their requests for information and/or the delivery of customer information in response to their queries.

It is to be understood the implementations of the present disclosure are not limited to the particular systems or methods described herein which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or steps.

The invention claimed is:

1. A method, in a data processing system comprising at least one processor and at least one memory, the at least one memory comprising instructions which are executed by the at least one processor and configure the at least one processor to implement a data retrieval system for requesting, accessing, and delivering data, the method comprising:

performing, by a participating subject (SUB) identification component executing within a server of the data retrieval system, an analysis to identify a SUB associated with a Requester (REQ);

obtaining, by a behavioral characteristics and advice (BCA) lookup component executing within the server of the data retrieval system, BCA data associated with the SUB and BCA data associated with the REQ;

incorporating the BCA data associated with the REQ into the BCA data associated with the SUB to generate BCA content;

generating, by a communication generation engine executing within the server of the data retrieval system, a BCA communication that enables retrieval of the BCA content; and sending, by the server of the data retrieval system, the BCA communication to the REQ.

2. The method of claim 1, wherein:

obtaining BCA data associated with the SUB comprises either retrieving electronically stored BCA data associated with the SUB or deriving BCA data associated with the SUB dynamically at run-time by means of at least one metadata element within the server of the data retrieval system; and obtaining BCA data associated with the REQ comprises either retrieving electronically stored BCA data associated with the REQ or deriving BCA data associated with the REQ dynamically at run-time by means of at least one metadata element within the server of the data retrieval system.

3. The method of claim 2:

wherein the at least one metadata element for deriving BCA data associated with the SUB is one or more unique test codes associated with the SUB.

4. The method of claim 2:

wherein the at least one metadata element for deriving BCA data associated with the REQ is one or more unique test codes associated with the REQ.

5. The method of claim 1, wherein the analysis to identify the SUB is based on a communication from the REQ received by a server of the data retrieval system.

6. The method of claim 5, further comprising:

performing, by a REQ identification component executing within the server of the data retrieval system, an analysis to identify the REQ based on the communication from the REQ.

7. The method of claim 6, wherein the communication from the REQ is an email communication and the analysis to identify the REQ comprises analyzing the email address associated with the communication from the REQ.

8. The method of claim 6, wherein the communication from the REQ is a text communication and the analysis to identify the REQ comprises analyzing the telephone number associated with the communication from the REQ.

9. The method of claim 5, wherein the communication from the REQ does not include personally identifiable information (PII) of the SUB or the REQ.

10. The method of claim 1, further comprising the REQ retrieving, via the BCA communication, the BCA content.

11. The method of claim 1, wherein the BCA communication does not include personally identifiable information (PII) of the SUB or the REQ.

12. The method of claim 1, wherein the BCA communication includes a link to retrieve the BCA content.

13. The method of claim 2, wherein the analysis to identify the SUB is based on a communication from the REQ received by a server of the data retrieval system.

14. The method of claim 13, further comprising:

performing, by a REQ identification component executing within the server of the data retrieval system, an analysis to identify the REQ based on the communication from the REQ.

15. The method of claim 14, wherein the communication from the REQ is an email communication and the analysis to identify the REQ comprises analyzing the email address associated with the communication from the REQ.

16. The method of claim 14, wherein the communication from the REQ is a text communication and the analysis to identify the REQ comprises analyzing the telephone number associated with the communication from the REQ.

17. The method of claim 13, wherein the communication from the REQ does not include personally identifiable information (PII) of the SUB or the REQ.

18. The method of claim 2, further comprising the REQ retrieving, via the BCA communication, the BCA content.

19. The method of claim 2, wherein the BCA communication does not include personally identifiable information (PII) of the SUB or the REQ.

20. The method of claim 2, wherein the BCA communication includes a link to retrieve the BCA content.

21. A computer program product comprising a computer readable storage medium having a computer readable program stored therein, wherein the computer readable program, when executed on at least one processor of a data processing system, causes the data processing system to implement a data retrieval system for requesting, accessing, and delivering data, wherein the computer readable program causes the data processing system to:

perform, by a participating subject (SUB) identification component executing within a server of the data retrieval system, an analysis to identify a SUB associated with a Requester (REQ);

obtain, by a behavioral characteristics and advice (BCA) lookup component executing within the server of the data retrieval system, BCA data associated with the SUB and BCA data associated with the REQ;

incorporate the BCA data associated with the REQ into the BCA data associated with the SUB to generate BCA content;

generate, by a communication generation engine executing within the server of the data retrieval system, a BCA communication that enables retrieval of the BCA content; and send, by the server of the data retrieval system, the BCA communication to the REQ.

22. An apparatus comprising:

a processor; and a memory coupled to the processor, wherein the memory comprises instructions which, when executed by the processor, cause the processor to implement a data retrieval system for requesting, accessing, and delivering data, wherein the instructions cause the processor to:

perform, by a participating subject (SUB) identification component executing within a server of the data retrieval system, an analysis to identify a SUB associated with a Requester (REQ);

obtain, by a behavioral characteristics and advice (BCA) lookup component executing within the server of the data retrieval system, BCA data associated with the SUB and BCA data associated with the REQ;

incorporate the BCA data associated with the REQ into the BCA data associated with the SUB to generate BCA content;

generate, by a communication generation engine executing within the server of the data retrieval system, a BCA communication that enables retrieval of the BCA content; and send, by the server of the data retrieval system, the BCA communication to the REQ.

* * * * *